(12) United States Patent
Addepalli

(10) Patent No.: US 11,150,720 B2
(45) Date of Patent: Oct. 19, 2021

(54) SYSTEMS AND METHODS FOR POWER MANAGEMENT OF HARDWARE UTILIZING VIRTUAL MULTILANE ARCHITECTURE

(71) Applicant: Sateesh Kumar Addepalli, San Jose, CA (US)

(72) Inventor: Sateesh Kumar Addepalli, San Jose, CA (US)

(73) Assignee: Sateesh Kumar Addepalli, San Jose, CA (US)

( * ) Notice: Subject to any disclaimer, the term of this patent is extended or adjusted under 35 U.S.C. 154(b) by 81 days.

(21) Appl. No.: 16/528,553

(22) Filed: Jul. 31, 2019

(65) Prior Publication Data

US 2020/0249743 A1 Aug. 6, 2020

Related U.S. Application Data

(60) Provisional application No. 62/801,051, filed on Feb. 4, 2019.

(51) Int. Cl.
  *G06F 1/26* (2006.01)
  *G06F 1/3246* (2019.01)
  (Continued)

(52) U.S. Cl.
  CPC ............. *G06F 1/3246* (2013.01); *G06N 5/04* (2013.01); *G06N 20/00* (2019.01); *G06F 1/3203* (2013.01)

(58) Field of Classification Search
  CPC ......... G06F 1/3246; G06N 20/00; G06N 5/04
  (Continued)

(56) References Cited

U.S. PATENT DOCUMENTS

| 5,487,153 A | 1/1996 | Hammerstrom et al. |
| 8,521,664 B1 | 8/2013 | Lin et al. |

(Continued)

FOREIGN PATENT DOCUMENTS

| CN | 102893233 B | 1/2016 |
| WO | 2011050482 A1 | 5/2011 |

(Continued)

OTHER PUBLICATIONS

International Search Report and Written Opinion for International PCT Application No. PCT/US2020/018142, dated May 28, 2020.

(Continued)

*Primary Examiner* — Volvick Derose
(74) *Attorney, Agent, or Firm* — Steven A. Nielsen; www.NielsenPatents.com

(57) ABSTRACT

Aspects of the present disclosure are presented for a power management system of a multilane AI system architecture. The system may include an orchestrator configured to control power and other operations of a lane. An uber orchestrator manages the overall system, and may know all of the multilane systems within the AI virtual multilane system that need to be active at a given frequency and power envelope for given price, and performance constraints. The orchestrator of each lane knows the compute/logic blocks that need to be active for a given AI app model AI processing chain execution. The orchestrator may be configured to send commands to turn off power to certain components that are not utilized in performing an AI execution sequence, deactivate operation to the lane when its functions are completed, and also modulate the clock frequency of a lane to fit the computation demands while minimizing power usage.

14 Claims, 11 Drawing Sheets

(51) Int. Cl.
*G06N 5/04* (2006.01)
*G06N 20/00* (2019.01)
*G06F 1/3203* (2019.01)

(58) Field of Classification Search
USPC .......................................................... 713/320
See application file for complete search history.

(56) References Cited

U.S. PATENT DOCUMENTS

| | | | |
|---|---|---|---|
| 9,285,783 | B2 | 3/2016 | Craig et al. |
| 2008/0137550 | A1 | 6/2008 | Jurca et al. |
| 2008/0235162 | A1 | 9/2008 | Spring |
| 2010/0185566 | A1 | 7/2010 | Schott et al. |
| 2010/0285082 | A1 | 11/2010 | Fernandez |
| 2012/0078436 | A1* | 3/2012 | Patel .................. H02J 3/06 700/298 |
| 2012/0101652 | A1 | 4/2012 | Shin et al. |
| 2012/0150361 | A1 | 6/2012 | Lazaris |
| 2012/0311488 | A1 | 12/2012 | Mouton et al. |
| 2013/0111487 | A1 | 5/2013 | Cheyer et al. |
| 2013/0262349 | A1 | 10/2013 | Bouchra et al. |
| 2015/0121113 | A1* | 4/2015 | Ramamurthy ...... H02J 7/00712 713/340 |
| 2015/0235308 | A1 | 8/2015 | Mick et al. |
| 2016/0239074 | A1 | 8/2016 | Lee et al. |
| 2017/0005515 | A1 | 1/2017 | Sanders et al. |
| 2017/0103314 | A1 | 4/2017 | Ross |
| 2017/0123419 | A1 | 5/2017 | Levinson et al. |
| 2017/0205863 | A1* | 7/2017 | Lee ..................... G06F 1/3296 |
| 2017/0213128 | A1 | 7/2017 | Hammond et al. |
| 2017/0213131 | A1 | 7/2017 | Hammond et al. |
| 2017/0308800 | A1 | 10/2017 | Cichon et al. |
| 2017/0318008 | A1 | 11/2017 | Mead |
| 2017/0323197 | A1 | 11/2017 | Gibson et al. |
| 2018/0129952 | A1 | 5/2018 | Saxena et al. |
| 2018/0293463 | A1 | 10/2018 | Brown |
| 2018/0322390 | A1 | 11/2018 | Das et al. |
| 2019/0286215 | A1* | 9/2019 | Paul .................... F24F 11/62 |
| 2019/0332892 | A1* | 10/2019 | Wickesberg ........... G06F 16/26 |
| 2020/0073469 | A1* | 3/2020 | Sadowski ............. G06F 9/5094 |
| 2020/0310372 | A1* | 10/2020 | Wang ................... G05B 19/042 |

FOREIGN PATENT DOCUMENTS

| | | |
|---|---|---|
| WO | 2017132590 A1 | 8/2017 |
| WO | 2018184208 A1 | 10/2018 |
| WO | 2018218259 A1 | 11/2018 |
| WO | 2019010065 A1 | 1/2019 |
| WO | 2020163303 A1 | 8/2020 |
| WO | 2020163308 A1 | 8/2020 |
| WO | 2020163315 A1 | 8/2020 |
| WO | 2020163320 A1 | 8/2020 |
| WO | 2020163327 A1 | 8/2020 |
| WO | 2020163333 A1 | 8/2020 |
| WO | 2020168100 A1 | 8/2020 |
| WO | 2020172045 A1 | 8/2020 |

OTHER PUBLICATIONS

International Search Report and Written Opinion for International PCT Application No. PCT/US2020/018150, dated May 21, 2020.
International Search Report and Written Opinion for International PCT Application No. PCT/US2020/016583, dated May 21, 2020.
International Search Report and Written Opinion for International PCT Application No. PCT/US2020/016545, dated Jun. 4, 2020.
International Search Report and Written Opinion for International PCT Application No. PCT/US2020/016565, dated Jun. 4, 2020.
International Search Report and Written Opinion for International PCT Application No. PCT/US2020/016553, dated May 28, 2020.
Wagh et al., Efficient and Private Neural Network Training [online] May 14, 2018 [retrieved May 29, 2020] from https:/eprint.iacr.org/2018/442/20180514:150605; Abstract.
International Search Report and Written Opinion for International PCT Application No. PCT/US2020/016560, dated Apr. 30, 2020.
International Search Report and Written Opinion for International PCT Application No. PCT/US2020/016574, dated Apr. 30, 2020.

\* cited by examiner

SYSTEMS AND METHODS FOR POWER MANAGEMENT OF HARDWARE UTILIZING VIRTUAL MULTILANE ARCHITECTURE

CROSS REFERENCE TO RELATED APPLICATION

This application claims priority to U.S. Provisional Application No. 62/801,051, filed Feb. 4, 2019, and titled "SYSTEMS AND METHODS FOR POWER MANAGEMENT OF HARDWARE UTILIZING VIRTUAL MULTILANE ARCHITECTURE," the disclosure of which is hereby incorporated by reference in its entirety and for all purposes.

TECHNICAL FIELD

The subject matter disclosed herein generally relates to artificial intelligence. More specifically, the present disclosures relate to systems and methods for power management of hardware that utilizes virtual multilane architecture.

BACKGROUND

One of the challenges of advancing in AI, and in AI hardware in particular, will be situations when one or more of the multilane systems as well as certain compute/logic blocks within an AI system may be idle or under-utilized or need to be modulated to a given frequency. This may result in power drain and energy wastage if there are no novel power management techniques to manage the resources. It is desirable to develop more efficient methods for managing power in an AI hardware environment, and particularly in an AI hardware environment that utilizes virtual multilane architecture.

BRIEF DESCRIPTION OF THE DRAWINGS

Some embodiments are illustrated by way of example and not limitation in the figures of the accompanying drawings.

DETAILED DESCRIPTION

Figure 1:
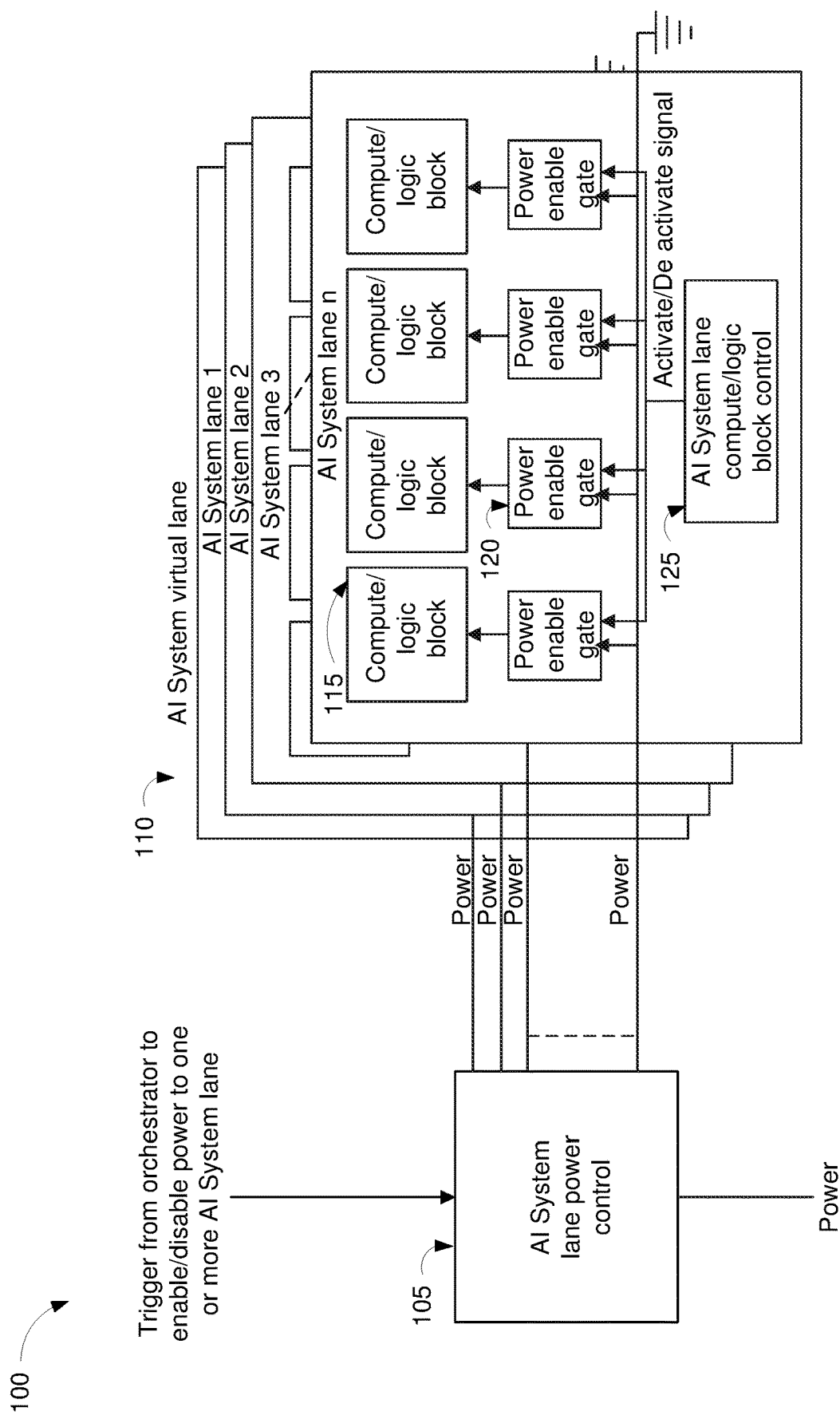
FIG. 1 shows a functional block diagram of the various modules used to control power to an AI multilane system, according to some embodiments.

Applicant of the present application owns the following U.S. Provisional Patent Applications, all filed on Feb. 4, 2019, the disclosure of each of which is herein incorporated by reference in its entirety:

U.S. Provisional Application No. 62/801,044, titled SYSTEMS AND METHODS OF SECURITY FOR TRUSTED AI HARDWARE PROCESSING;

U.S. Provisional Application No. 62/801,046, titled SYSTEMS AND METHODS FOR ARTIFICIAL INTELLIGENCE HARDWARE PROCESSING;

U.S. Provisional Application No. 62/801,048, titled SYSTEMS AND METHODS FOR ARTIFICIAL INTELLIGENCE WITH FLEXIBLE HARDWARE PROCESSING FRAMEWORK;

U.S. Provisional Application No. 62/801,049, titled SYSTEMS AND METHODS FOR CONTINUOUS AND REAL-TIME AI ADAPTIVE SENSE LEARNING;

U.S. Provisional Application No. 62/801,050, titled LIGHTWEIGHT, HIGH SPEED AND ENERGY EFFICIENT ASYNCHRONOUS AND FILE SYSTEM-BASED ARTIFICIAL INTELLIGENCE PROCESSING INTERFACE FRAMEWORK.

Applicant of the present application also owns the following U.S. Non-Provisional Patent Applications, filed herewith, the disclosure of each of which is herein incorporated by reference in its entirety:

16/528,545 titled SYSTEMS AND METHODS OF SECURITY FOR TRUSTED AI HARDWARE PROCESSING;

16/528,543 titled SYSTEMS AND METHODS FOR ARTIFICIAL INTELLIGENCE HARDWARE PROCESSING;

16/528,548 titled SYSTEMS AND METHODS FOR ARTIFICIAL INTELLIGENCE WITH A FLEXIBLE HARDWARE PROCESSING FRAMEWORK;

16/528,549 titled SYSTEMS AND METHODS FOR CONTINUOUS AND REAL-TIME AI ADAPTIVE SENSE LEARNING; and 16/528,551titled LIGHTWEIGHT, HIGH SPEED AND ENERGY EFFICIENT ASYNCHRONOUS AND FILE SYSTEM-BASED ARTIFICIAL INTELLIGENCE PROCESSING INTERFACE FRAMEWORK.

Aspects of the present disclosure are presented for methods and systems in power management of an AI multilane system. In some embodiments, the AI multilane system includes an intelligent power railing. The power railing may enable each virtual lane of the multilane system to run at a configurable frequency for required performance/speed and power dissipation by the hardware by modulating to the given power envelope for the corresponding frequency. Additionally, the power railing may eliminate unnecessary static and dynamic power usage by turning off un-utilized hardware segments, namely, one or more multilanes in the AI system to eliminate the whole power dissipation. In some embodiments, the AI system includes a dynamic power management module that provides a signal activation based wake-up to eliminate dynamic power usage during idle time.

As presented herein, a scheduler and management module of a lane of a multilane AI system architecture of the present disclosure, which may be referred to as an orchestrator, is configured to control power and other operations of a lane. An uber orchestrator manages the overall system, and may know all of the multilane systems within the AI virtual multilane system that need to be active at a given frequency and power envelope for given price, and performance constraints. The orchestrator of each lane knows the compute/logic blocks that need to be active for a given AI app model AI processing chain execution. The orchestrator may be communicatively coupled to a sequencer, which performs the execution of an AI chain in the lane. Before sending an activation command to the sequencer component for execution, the orchestrator sends an activate trigger command to the AI system power management logic. The trigger contains a command to enable power to all lanes in the AI system to be involved in the upper level AI processing chain that meets the above constraints. Within a lane of the multilane environment, the AI multilane logic power control sends an activate signal to all compute blocks that are part of the AI processing chain defined for the lane, thus enabling dynamic power for the participating blocks. Once the sequencer module completes the execution, it informs the orchestrator. At that point, the orchestrator sends a deactivate trigger with commands to disable power to all lanes within the multilane system that were involved in the AI processing chain execution. In this way, power to the corresponding lanes will be stopped. Thus power to the lanes can be managed on demand which allows for saving substantial power usage.

a. AI System Virtual Multilane Intelligent Power Railing

In some embodiments, a power railing is included to manage power distribution among the multilane environment of an AI system. The power railing is configured to receive commands from the orchestrator. The virtual multilane power railing lane power control manages the power delivery to all the lanes of the AI system in the AI system hardware. The orchestrator plans and controls the AI system lanes that are required to be active for a given AI app model AI processing chain execution. Before sending the execution sequence to the sequencer module for execution, the orchestrator sends an activate trigger to the AI system lane power control logic. The power control logic then removes the power gating to the specified AI system lane. This causes the lane to be powered up for computation. Once the computation is completed, the sequencer of the corresponding AI system lane will inform the orchestrator regarding the job status. The orchestrator then may determine the current workload of a lane, and if the lane is not tasked to perform more operations, the orchestrator sends the shutdown signal to the corresponding lane. The AI system lane compute logic block power control will then shut off the power to the lane by invoking the power gating to the lane.

Illustration 100 of FIG. 1 shows a functional block diagram of the various modules used to control power to the AI multilane system, according to some embodiments. A description of the multilane system, including description of the functionality of the uber orchestrator and the orchestrator, is shown more in U.S. Provisional Application No. 62/801,046, filed, Feb. 4, 2019, and titled, "SYSTEMS AND METHODS FOR ARTIFICIAL INTELLIGENCE HARDWARE PROCESSING," U.S. Provisional Application No. 62/801,048, filed, Feb. 4, 2019, and titled, "SYSTEMS AND METHODS FOR ARTIFICIAL INTELLIGENCE WITH A FLEXIBLE HARDWARE PROCESSING FRAMEWORK," U.S. Provisional Application No. 62/801,049, filed, Feb. 4, 2019, and titled, "SYSTEMS AND METHODS FOR CONTINUOUS & REAL-TIME AI ADAPTIVE SENSE LEARNING," and U.S. Provisional Application No. 62/801,050, filed, Feb. 4, 2019, and titled, "S LIGHTWEIGHT, HIGHSPEED AND ENERGY EFFICIENT ASYNCHRONOUS AND FILE SYSTEM-BASED AI PROCESSING INTERFACE FRAMEWORK," which are again incorporated herein by reference. A trigger from the orchestrator is sent to the AI system power control module 105, which overall controls power signals to all of the lanes of the multilane system 110, the multilane system 110 of which is exemplified in the combination of lanes 1, 2, 3 . . . n in FIG. 1. When a lane is activated, the local AI system lane compute/logic block power control module 125 of that lane manages the computations of each compute/logic block 115 in that lane. The AI system lane compute/logic block power control module 125 of each lane is configured to manage the power for just that specific lane, while power is delivered to that lane from the AI System lane power control 105. The power control signals get distributed from the AI system lane power control 105, to the compute/logic block power control modules specific to each lane 125. The power enable gates, e.g., power enable gate 120, are the conduits through which the compute/logic blocks 115 receive the power that is managed by the compute/logic block control module 125. The compute/logic blocks 115 perform the calculations as required for the given task at hand. The process for improving power management as described above may be applied to the functional block diagram of FIG. 1 consistent with the above description.

Figure 2:
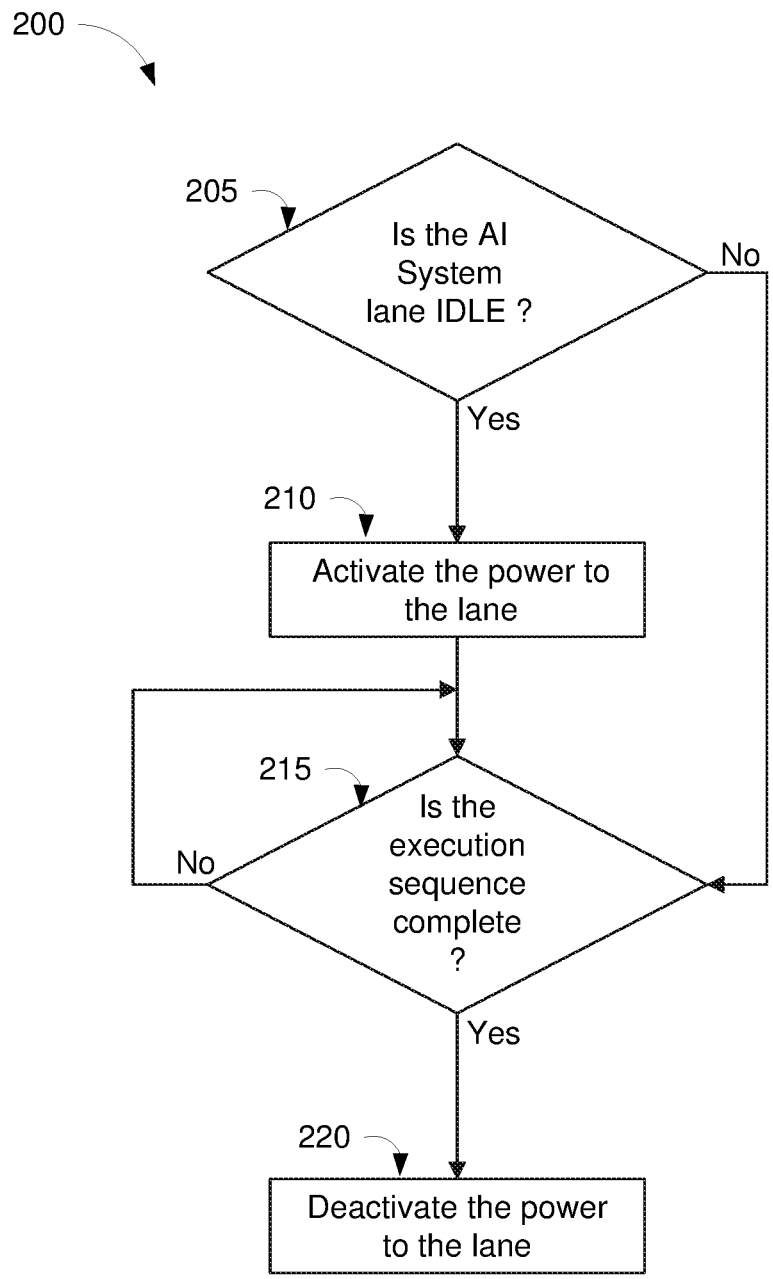
FIG. 2 shows an example flowchart for how an orchestrator of an AI system determines to control power of any lane in the multilane system, consistent with the descriptions of FIG. 1, according to some embodiments.

Referring to FIG. 2, illustration 200 shows an example flowchart for how the orchestrator of the AI system determines to control power of any lane in the multilane system, consistent with the descriptions above, according to some embodiments. The orchestrator may be in control of multiple lanes that combine to form a multilane system, and the orchestrator may be responsible for determining what power to supply to each lane at any given point in time, that may be dependent on the processing need throughout the multilane system. That is, the power needs may vary, depending on the complexity of the operations and other factors. Here, at block 205, the orchestrator first determines if a lane is idle, which may be based on a signal supplied by the specific lane when it is done performing its operations. If a lane is idle, at block 210, then it is available to be activated when needed, so the orchestrator may eventually send a signal to activate that lane. If it is not idle, at block 215, then that lane is currently operating and so the orchestrator next determines if the execution sequence that the lane is processing is complete. The orchestrator will also proceed to this step after activating that lane. The orchestrator takes no action until the execution sequence is complete, and then once it learns that the execution sequence has finished via receiving a completion message, at block 220, the orchestrator then sends a de-activate command to the lane.

b. AI System Based Dynamic Power Management

The power consumption of each lane and functional units can be controlled by the AI system lane compute/logic block power control logic. Each AI solution and the size of the AI solution model may need to utilize a certain number of lanes in order to properly complete its specified functions and purposes. These particular AI execution algorithm requirements may be fulfilled by the orchestrator by identifying the specific lane and compute blocks to be used to meet the AI algorithm execution requirements. This input is provided to the AI system lane compute/logic block power control that is local to each lane (see FIG. 1). It will use this input to modulate the frequency, then enable clock gating for some compute blocks. For reference, an AI solution model may be an AI model output that solves a problem or a request made by a user. For example, an AI solution model may be the output by the AI system based on the user having requested of the AI system to generate a model that, when performed by the AI system, organizes images into various categories after being trained on a set of training data.

The power management block contains a clock divider and clock gating logic, according to some embodiments. The compute logic blocks support multiple clock frequencies. To reduce the power consumption, slower clocks will be fed to the compute engine block, hence they will use less power to compute. Lower clock frequency provides lower performance and a lower energy map. To avoid the dynamic power dissipation by the idle compute blocks in the lane, the clock gating logic is enabled to that compute block. Once the clock gating is enabled, no clock is fed to the compute block. Hence, the idle compute engine in a lane does not dissipate dynamic power. The AI system uses dynamic power management only to power the blocks which require power or are active.

This kind of power management disclosed herein is believed to provide a novel architecture at least because the hardware employing these techniques distributes operational load to compensate for varying performance levels of different hardware components. For example, suppose hardware utilizes the power management techniques disclosed herein. If an AI algorithm operating on such hardware requires X number of computations to complete, then the each computation would consumes Y cycles, depending on the hardware. The time to complete the computation is given by $L=X*Y/$(frequency of operation of a PLU). Hence, the latency to complete the above computation is dependent on the user requirement and the environment in which the chip is running. If the latency is low, then power required to complete the computation is more since it has to complete the work fast. For larger latency, the power requirement is less, since the hardware operates at low frequency. Hence, the power profile for the execution of the AI algorithm can be set using this novel architecture. Hence, depending on the usage environment of the chip, the power profile could be set.

Figure 3:
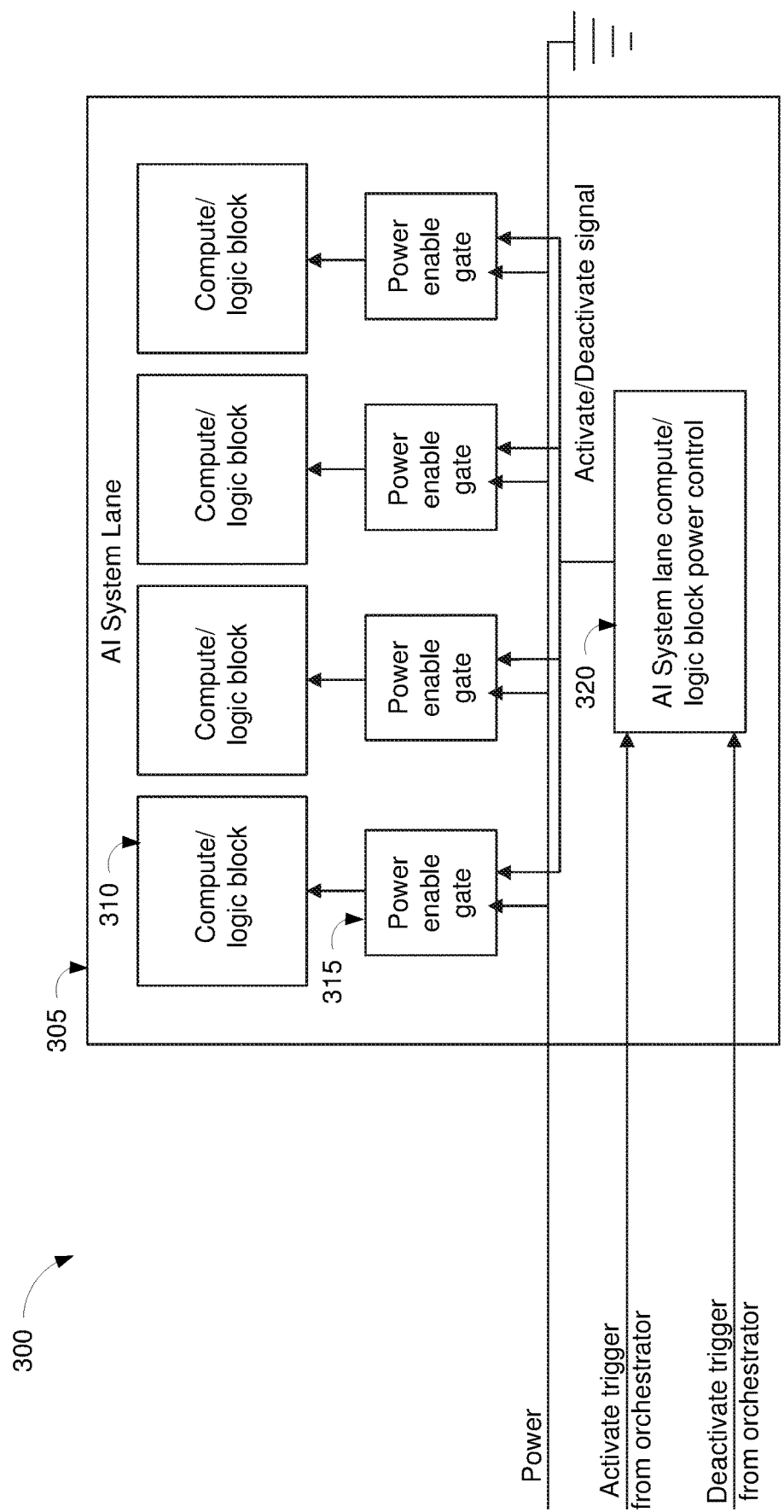
FIG. 3 shows an extension of FIG. 1 of how the activate and deactivate triggers reach a lane of the AI multilane system, according to some embodiments.

Referring to FIG. 3, illustration 300 shows an extension of FIG. 1 of how the activate and deactivate triggers reach a lane of the AI multilane system, according to some embodiments. The triggers are received from the orchestrator after the orchestrator determines when it is the appropriate time to send the triggers. They reach the compute/logic block power control module 320 of the lane 305, which is then transmitted to each of the compute/logic blocks 310 via their respective power enable gates 315. While the triggers represent signals to activate or deactivate the compute/logic blocks 310, the power connection still reaches each compute/logic block 310 regardless.

Figure 4:
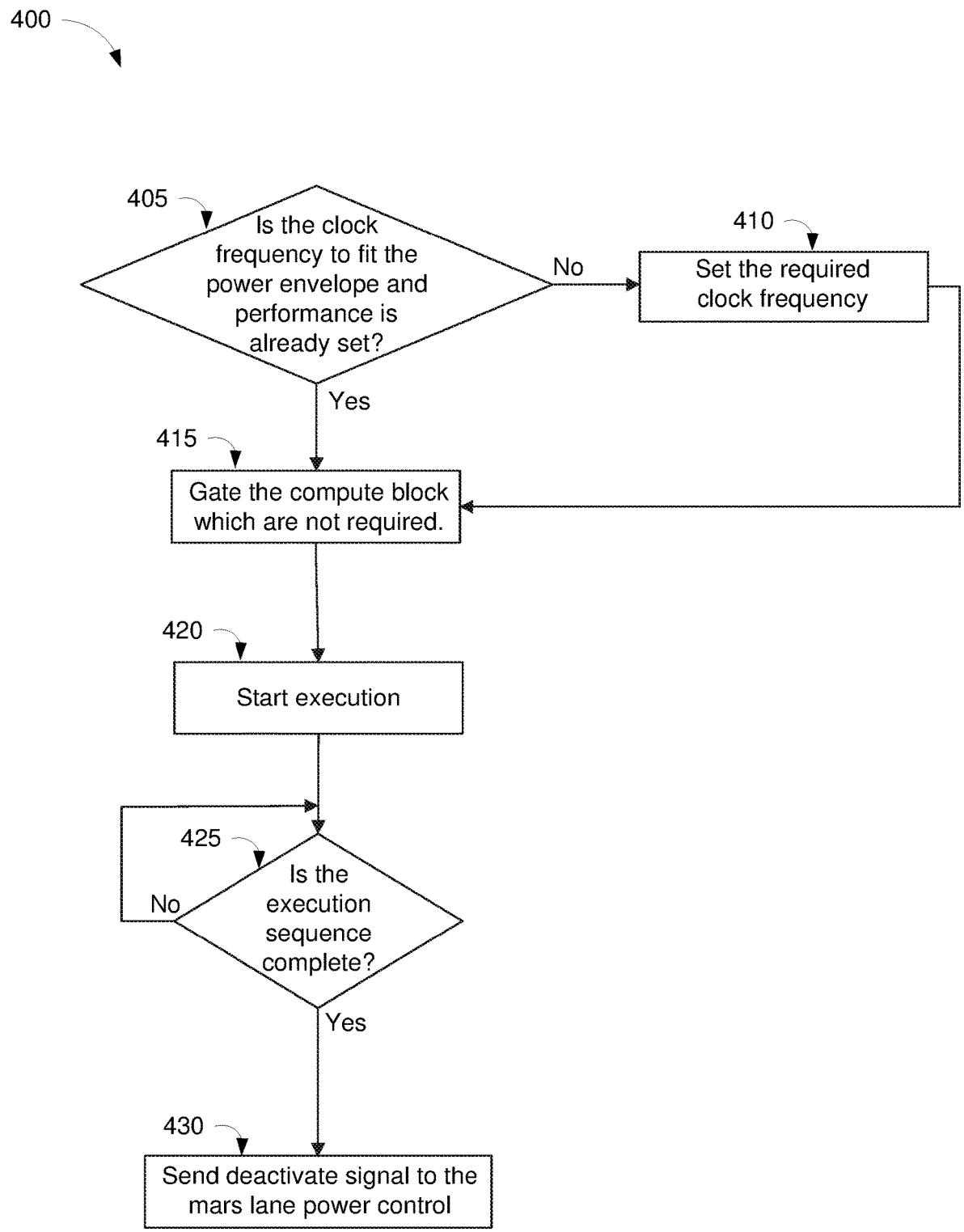
FIG. 4 describes a flowchart of how a deactivate signal is sent to a lane, which effectively stops a lane from performing additional operations, according to some embodiments.

While FIG. 2 discusses how the power is turned on or off to each lane, flowchart 400 of FIG. 4 describes a flowchart of how the deactivate signal is sent to a lane, which effectively stops a lane from performing additional operations, according to some embodiments. In some cases, the flowchart 400 may be performed by the AI system lane compute/logic power control module, while in other cases it is performed by the orchestrator. For example, at block 405, the orchestrator checks if the clock frequency to fit the power envelope and performance is already set or synchronized. If it is not, then at block 410, the required clock frequency is set by a command from the orchestrator. The orchestrator may utilize appropriate frequency control logic with each lane to set the clock. Notice that each lane may vary with needing to set different clock settings, and the orchestrator may be configured to adjust the power needs and tasks performed based on the varying clock speeds of each lane. This is not trivial since the lanes combine to form a multilane system that requires the lanes to operate in parallel and in coordination with one another, so timing is important for optimized performance. Once that is handled, at block 415, the compute blocks that are not required are gated, and then the sequence determined for the lane is performed at block 420. At block 425, once the sequence finishes, the lane transmits a signal indicating as such, and the orchestrator then sends a signal to the local lane power control to deactivate the lane at block 430.

If the lane is partially active, the AI system can shut off the power to the lane. Hence, part of the lane which is sitting idle will have their clock frequency gated. Due to clock gating, the dynamic power to the idle compute module is eliminated.

The power management systems and methods described herein are believed to be unique in the industry. The uber orchestrator and the orchestrators of each AI lane are designed to uniquely handle an AI hardware architecture in an efficient manner that improves performance of AI functionality compared to if the AI algorithms were implemented on traditional hardware and software. The uber orchestrator and orchestrators of each lane manage allocation and trigger of the AI processing chain overall, and the corresponding AI virtual lane, which is made up of one or more AI (physical) lanes. Therefore, the uber orchestrator and respective orchestrators of designated lanes in turn manage the AI system lanes and in turn manage their respective AI compute engines, AI-PLUs, S-PLUs, ADI-PLUs etc., for a given AI solution model. Similarly, the uber orchestrator and orchestrators of each lane instruct their respective power management modules to enable power through a power gating/railing/trigger to only specific hardware components that need to be activated for that specific AI solution model. That is, the uber orchestrator and specified orchestrators are configured to provide power to specific AI virtual lanes, specific AI lanes within said AI virtual lanes, specific AI compute blocks within said AI lanes, and specific AI-PLUs, S-PLUs, ADI-PLU that participate in the AI processing chain, using the power railing and dynamic power management techniques described herein.

Other power managers of traditional hardware are not configured to provide power in such specific ways. This is at least because the orchestrators of the present disclosure have knowledge of the functional capacity of a given AI compute engine, AI-PLU, S-PLU, and ADI-PLU for a given power performance per watt. This may be referred to herein as the CP-Func. In other words, the CP-Func is the power performance per watt assigned to an AI compute engine, AI-PLU, S-PLU, and ADI-PLU with the corresponding functionality spent in a cycle. Hence required AI Solution Model functionality is satisfied by equation Performance=$K \times$Frequency Where K=Sum of all CP-Func corresponding to each of the compute engine, AI-PLU, S-PLU, and ADI-PLU participating in the AI processing chain.

Correspondingly, AI compute engines, AI-PLUs, S-PLUs , ADI-PLUs within an AI lane not participating are not enabled with power, and the uber orchestrator and associated orchestrators are also able to control these aspects. Similarly, AI lanes not participating on AI processing at a given time are disabled from power except minimal power for maintenance.

In contrast, traditional non-AI based processors do not have any of the above structural AI functional constructions, including AI based parallelism and pipelining, and consequently none of the above described novel power management techniques.

This is because traditional non-AI based processors such a CPU, GPU or combination thereof, operate at basic instruction level granularity (e.g., ADD, SUB, MUL, MOV, etc.). AI software frameworks that run AI solution models run stop of OS & full stack, which in turn operate on one or more non-AI processors that is, CPUs, GPUs or combination thereof. Hence, the granularity of allocation to specific hardware components is based on the number of CPUs/ GPUs and threads within CPUs/GPUs. Their performance and power is dependent on the number OS, full stack, AI software framework, and algorithms running on top of an AI software framework, AI solution model logic, AI solution model data, instruction overhead etc. Hence, allocation is purely based on trial & error, and is controlled via software, not hardware, unlike the designs of the present disclosure. Hence, satisfying all the requirements and achieving corresponding power requirements is very un-predictable due to too many layers, logics, over-heads across OS, full stack framework, and so on. Unlike aspects of the present disclosure, there is no predictable power management technique that can be applied to such non-AI processors.

Moreover, AI solution models running on an AI software framework that in turn run on non-AI based processors (e.g., CPU, GPU, FPGA) can only manage power at a granularity permitted by the non-AI based processors only. They cannot exert an AI solution model functional control to achieve maximum performance at minimum power, due to the non-AI based processors (CPU/GPU/FPGA) lacking such granular controls.

Based on the disclosures herein, the power management system allows for several aspects. For example, the present AI power management system provides significant dynamic and static power savings and energy efficiency. In addition, these methods provide less heat dissipation, as well as cost saving from low power usage and dynamic pricing for a given performance needs.

The present disclosures provide solutions that differ from known techniques in a number of ways. Compared to known techniques, none are known to have the novel AI system architecture described herein, nor do they support the novel AI solution model execution level innovative power control described herein that is designed to adapt and save power dramatically.

Additional example details about the structure of an AI system lane regarding its power specifications are shown more in FIG. 11, below.

Discussion of Overall System

U.S. Provisional Application No. 62/801,046, filed, Feb. 4, 2019, and titled, "SYSTEMS AND METHODS FOR ARTIFICIAL INTELLIGENCE HARDWARE PROCESSING ," and U.S. Provisional Application No. 62/801,048, filed, Feb. 4, 2019, and titled "SYSTEMS AND METHODS FOR ARTIFICIAL INTELLIGENCE WITH FLEXIBLE HARDWARE PROCESSING FRAMEWORK" which are again incorporated herein by reference, describe further details about the structure and functional blocks of an AI system of the present disclosures that may utilize the efficient power management system described herein.

Figure 5:
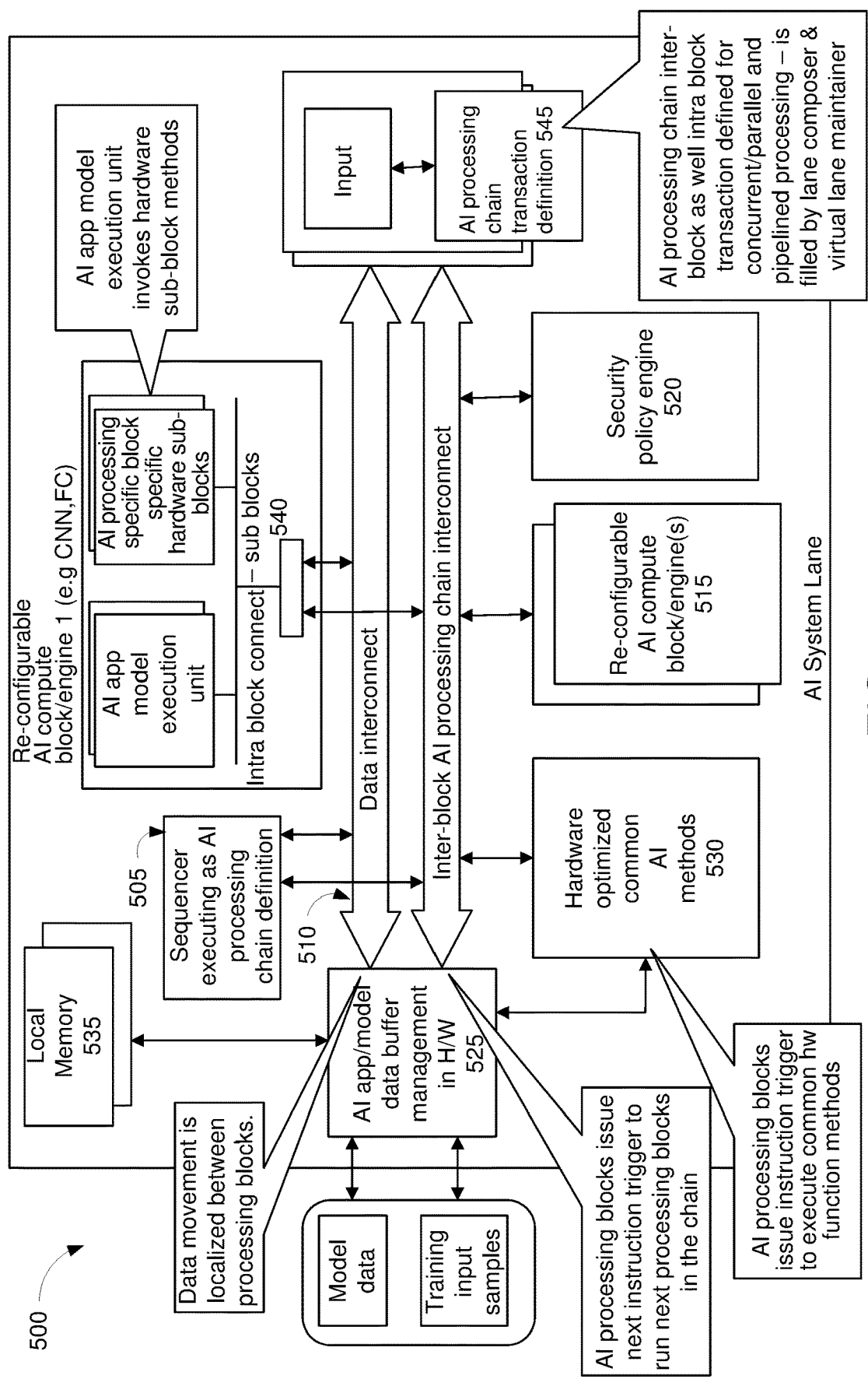
FIG. 5 is a diagram of an AI system lane comprising energy efficient hyper parallel and pipelined temporal and spatial scalable artificial intelligence (AI) hardware with minimized external memory access, in accordance with at least one aspect of the present disclosure.

For example, FIG. 5 is a diagram 500 of an AI system lane comprising energy efficient hyper parallel and pipelined temporal and spatial scalable artificial intelligence (AI) hardware with minimized external memory access, in accordance with at least one aspect of the present disclosure. An AI system lane is an integrated secure AI processing hardware framework with an amalgamation of hyper-parallel-pipelined (HPP) AI compute engines interlinked by data interconnect buses with a hardware sequencer 505 to oversee AI compute chain execution. The execution flow is orchestrated by the sequencer 505 by using an AI processing chain flow. The blocks within the AI system lane are interconnected by high bandwidth links, e.g., data interconnects 510 and inter-block AI processing chain interconnects, to transfer the output between each other. Therefore, one or more AI compute engines can run in parallel/pipeline to process the AI algorithm.

In various aspects, an AI system lane comprises eight major blocks, such as re-configurable AI compute engine blocks 515, interconnects 510, a sequencer 505, common method processing blocks 530, local memory 535, security policy engine block 520, AI application data management buffer 525, intra block connect sub blocks 540, etc. All the modules work together to solve the task assigned to the AI system lane.

In one aspect, the AI system lane comprises re-configurable AI compute engines/blocks hardware 515. The re-configurable AI compute engines/blocks hardware is an AI system integrated high performance and highly efficient engine. The re-configurable AI compute engines/blocks hardware computes the AI methods assigned by the sequencer 505. The sequencer 505 is comprised of a state machine with one or more configurable AI-PLUs to process the AI application/model. The sequencer 505 maintains a configurable AI-PLU to compute different type of methods. Due to the configurable nature of the hardware, utilization is very high. Hence, a high throughput is achieved at a low clock frequency and the process is very energy efficient. In case of secure processing, it also contains one or more S-PLUs to process security related features and consequently provide iron clad security to the AI system lane as well as enabling a wide range of AI driven security applications. The re-configurable AI compute engine blocks 515 eliminate the need for an operating system and AI software framework during the processing of AI functions.

In one aspect, the AI system lane comprises local memory 535. The local memory 535 may be a high speed memory interfaced to the AI application data management hardware 525. It has the data, the layer results, weights, and inputs required by the AI system lane to execute.

In one aspect, the AI system lane comprises a common method processing block 530. The common method processing block 530 contains the hardware to process common functions. For example, encrypting the output, etc.

In one aspect, the AI system lane comprises an AI application data management buffer block 525. The AI application data management buffer block manages the memory requirement between the blocks. It also maintains the data transfer between the global memory and local memory.

In one aspect, the AI system lane comprises data and AI processing chain interconnects 510. All the blocks are connected by the data interconnect bus and an inter-block AI processing chain interconnect bus. The data interconnect bus transfers data within the engines and transfers to local memory. The inter-block AI processing chain interconnect bus carries all the control information. Control blocks include, for example, application buffer management H/W, sequencer, and instruction trigger modules. Data movement is localized within the blocks. The data interconnect bus has higher bandwidth when compared to the inter-block AI processing chain interconnect.

In one aspect, the AI system lane comprises a sequencer 505. The sequencer directs AI chain execution flow as per the inter-block and intra-block transaction definition 545. An AI system lane composer and virtual lane maintainer provides the required definition. The sequencer 505 maintains a queue and a status table. The queue contains model identification (ID), type of methods and configuration data for the layer(s). The model ID differentiates the model being executed. The methods inform the sequencer the type of re-configurable AI compute engine blocks to use. Configuration data contains the macro parameters that are required by the engines to execute the model properly. The status table contains the status of all the AI processing blocks. The table maintenance is active whether the AI processing block is busy or idle. All the operations will be queued by the lane orchestrator in the sequencer 505. The sequencer will trigger the operation from the queue depending on the available AI-PLU block which is idle. Once an operation is completed by the AI-PLU block, the sequencer 505 will change the corresponding entry to idle in the status table and reports it to the lane orchestrator about the completion. The lane orchestrator will now ask the AI system lane for the transfer of the output if all the tasks related to the input with respect to the model are completed.

Figure 6:
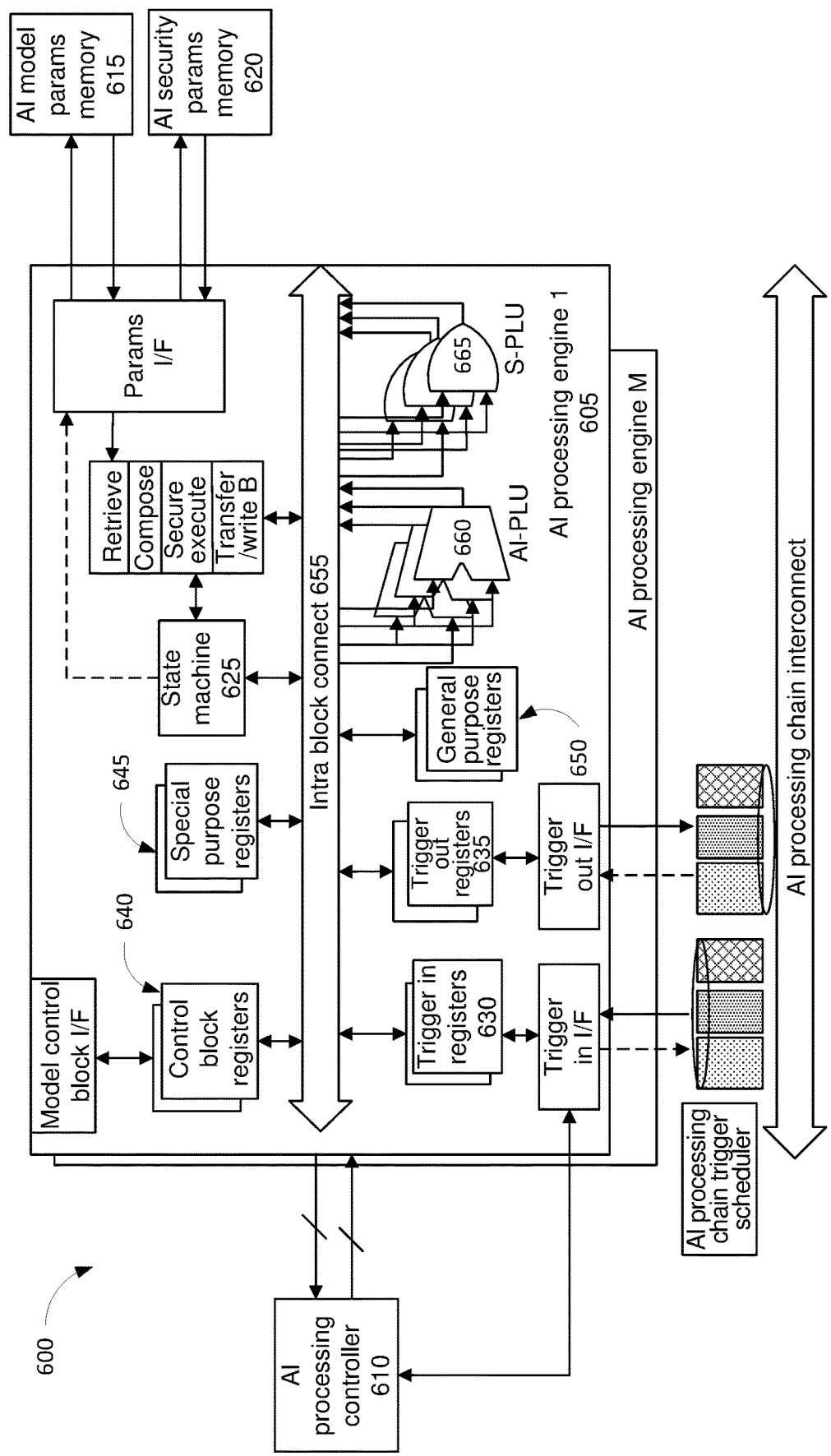
FIG. 6 is a diagram of a secure re-configurable AI compute engine block with no traditional software overhead during model execution (inference or training) for speed and efficiency, in accordance with at least one aspect of the present disclosure.

FIG. 6 is a diagram 600 of a secure re-configurable AI compute engine block 515 (see e.g., FIG. 5) with no traditional software overhead during model execution (inference or training) for speed and efficiency, in accordance with at least one aspect of the present disclosure. As used herein, the secure re-configurable AI compute engine block 515 comprises at least one AI processing engine 605 (shown here are multiple engines 1 through M), an AI processing controller 610 coupled to the processing engine(s) 605, an AI solution model parameters memory 615 coupled to the processing engine(s) 605, and an AI security parameters memory 620 coupled to the processing engine(s) (205. The processing engine comprises a state machine 625, trigger in/out registers 630 and 635, a control register 640, a special purpose register 645, a general purpose register 650, and an intra block connect bus 655 for communication and control between the registers 630, 635, 645, 650, control blocks 640, and state machine 625. The processing engine also comprises AI processing logic units (AI-PLUs) 660 and security processing logic unit (S-PLUs) 665 coupled to the intra block connect bus 655.

In one aspect, the AI compute engine block 515 comprises a plurality of processing engines 605 configured to trigger the state machine 625 for different memory and control transactions. The AI compute engine block 515 manages the chain of triggers required to complete a subsequent layer and also manages the memory transaction triggers. Control transaction includes triggering the state machine 625 corresponding to the method, software resetting the processing engine, etc. The compute engine block 515 also manages the memory triggers triggered by the state machine 625 such as write or read. The memory master, which resides outside of the AI compute engine block 515, will trigger the state machine 625 once the memory transaction triggered by the state machine 625 is completed. So all the combination of AI method trigger, memory transaction trigger, and software reset is managed by the trigger in/out registers 630 and 635.

In one aspect, the AI compute engine block processing engine(s) 605 comprises AI processing logic units (AI-PLUs) 660. Each of the AI-PLUs contains a set of multiplier, comparators and adders functional units. This fabric of functional units can be configured by the AI parameters to process AI methods such as CNN forward/backward, fully connected (FC) forward/backward, max-pooling, un-pooling, etc. This configuration is dependent on the dimensions of the model, type of the AI method and memory width (number of vector inputs that can be fetched at a single clock). The AI-PLU(s) 660 can process wide vectors at a single clock in a pipelined configuration. Hence it has high performance and is energy efficient.

In one aspect, the AI compute engine block processing engine(s) 605 comprises security processing logic units (S-PLUs) 665. Each of the S-PLUs contains a set of cryptographic primitives such as hash functions, encrypt/decrypt blocks, arranged in parallel and pipelined configuration to implement various security/trust functions. This fabric of functional units can be configured with the security parameters to process certain security features. These configurations are directed by the security policy engine. It can process wide security processing vectors at a single clock in a pipelined configuration. Hence, it has high performance and is energy efficient. In addition to protecting the AI application/solution models, S-PLUs in conjunction with AI-PLUs and other security and trust features built on to the AI system can run AI driven security applications for a range of use cases and markets.

In one aspect, the AI compute engine block processing engine(s) 605 comprises a state machine 625. The state machine 625 is the brain of the AI compute engine block. The state machine 625 takes control input and does the required task to complete the computation. The state machine 625 contains four major states: retrieve, compose, execute, and transfer/write back state. The behavior of the state machine 625 can be configured using the parameter set by the configure module namely, security parameters, AI application model parameters, etc. The state machine 625 can run inference or back propagation depending on type of flow chosen. It engages extra PLU's for weight update and delta calculation. In various states, the state machine 625 interfaces with the AI solution model parameters memory and the AI security parameters memory via a parameters interface (I/F).

The retrieve state retrieves the input from the local memory of the AI system lane as described with reference to FIG. 5. Returning now to FIG. 6, the retrieve state also may retrieve the partial output from the previous iteration depending on the data dependency of the computation. If security is enabled, the retrieve state also retrieves security related parameters and credentials.

The compose state composes the input to the AI-PLUs of the AI compute engine 515. This depends on the input length, number of parallel hardware present PLU of the engine and also aligns the inputs in the order in which the parallel hardware in the PLU will process the data.

Once the data is composed, the execute state provides the execute signal to one or more sub-blocks/PLUs (S-PLUs and AI-PLUs) to process the input data.

The transfer/write back state writes back the partial results from the PLUs output to a general purpose register or transfers the final output from the PLUs to the local memory.

In one aspect, the AI compute engine block processing engine 605 comprises a general purpose register 650. The general purpose register 650 stores temporary results. The general purpose register 650 is used to store the partial sum coming from the AI-PLU output. These registers are filled by the write back state of the state machine 625.

In one aspect, the AI compute engine block processing engine comprises a control block register 640. The control block register 640 contains the different model parameters required to control the state machine 625. The control block registers 640 are a set of parameters computed on the fly which is used by the state machine 625 to accommodate the input AI solution model with variable size into the specific width parallel hardware present in the AI-PLU hardware. Control registers are used by the state machine 625 to control execution of each state correctly. The control block registers interface with the AI system lane described with reference to FIG. 5 via a model control interface (I/F).

Returning now to FIG. 6, in one aspect, the AI compute engine block processing engine comprises special purpose registers 645. Special purpose registers 645 are wide bus registers used to perform special operations on a data vector at once. The special purpose register 645 may perform the bit manipulation of the input data vector to speed up the alignment of the vector required by the PLU to process the data. The special purpose register 645 may perform shifting/AND/OR/masking/security operations on the large vector of data at once. These manipulations are controlled by the state machine in the compose state. This vector of data from the special purpose is fed into the parallel PLU hardware to compute.

In one aspect, the AI compute engine block comprises an intra block connect bus 655. The intra block connect bus contains the control and data bus required to the communication with different block present within the AI compute engine block. The data path is a high bandwidth bus which supports wide data width data transfer (e.g., 256 bit/512 bit/1024 bit). The control path requires high bandwidth and less data width buses. Local memory is used by the AI compute engine blocks to compute. An interconnect bus within the lanes fills the local memory, which the AI compute engines use to compute the output. Accordingly, this makes the AI compute engine robust and hence does not require the interconnect bus for improved efficiency.

In one aspect, the AI compute engine block comprises AI solution model parameters stored in the AI solution models parameters memory 615 coupled to the processing engine. The state machine 625 reads and writes AI solution model parameters to and from the AI solution models parameters memory via the parameters interface (I/F). Each of the AI solution model parameters contains the configuration data such as input dimension of the model, weight dimension, stride, type of activation, output dimension and other macro parameters used to control the state machine. Thus, each layer could add up to 32 macro parameters.

Figure 7:
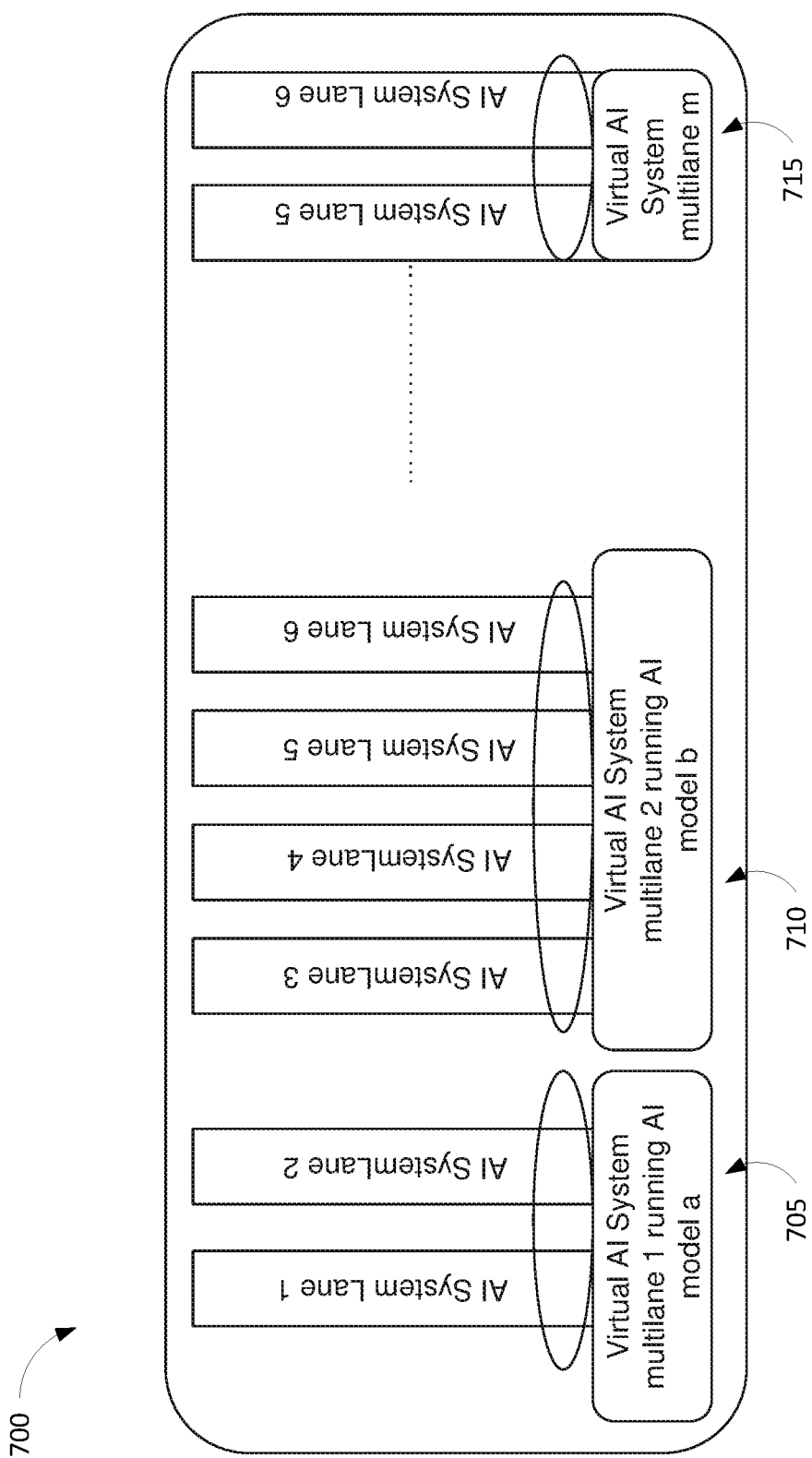
FIG. 7 is a diagram of a virtual AI system lane created to execute, training and inference, in accordance with at least one aspect of the present disclosure.

For example, referring to FIG. 7, illustration 700 shows a diagram of a virtual AI system lane created for execution, training and inference of an AI model in accordance with at least one aspect of the present disclosure. A virtual AI system lane may be implemented by first creating one virtual lane. Virtual AI system lanes according to the present disclosure are allocated to process an AI model that meets a given performance criteria and other requirements rather than employing traditional VMs and GPUs allocation to meet AI software framework performance requirements to process an AI model.

Illustration 700 shows that a virtual AI system lane is created to execute the AI model by dynamically allocating one or more AI system lane hardware units based on the size of the AI model and the required execution speed to create a virtual AI system lane. All ideas must be aligned so that it can be compared with GPU virtualization. To create full virtualization, different groups of virtual AI system lanes are configured to execute different models. As shown in FIG. 7, a first virtual AI system multilane 705 comprises two AI system lanes configured to execute AI model "a." A second virtual AI system multilane 710 comprises four AI system lanes configured to execute AI model "b." An arbitrary virtual AI system multilane 715 comprises two AI system lanes configured to execute AI model "m."

Figure 8:
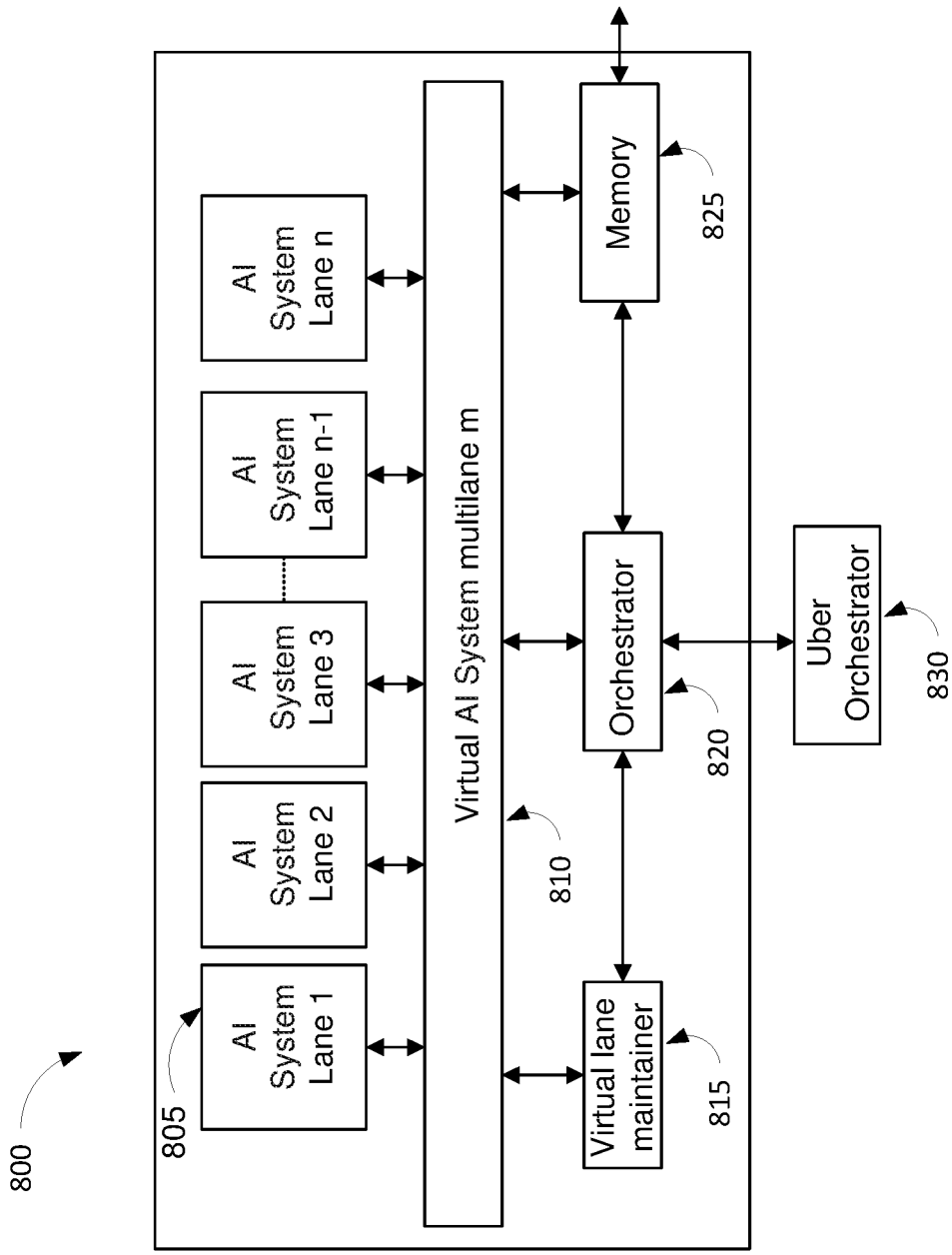
FIG. 8 is a diagram of a virtual AI system multilane, in accordance with at least one aspect of the present disclosure.

Referring to FIG. 8, illustration 800 is a diagram of a virtual AI system multilane, in accordance with at least one aspect of the present disclosure. Depending on the AI model network structure and performance requirement of the network, the AI model calculation is mapped to multiple lanes 805, etc., in order to create the virtual AI system multilane 810 shown in FIG. 8. Each element of the virtual AI system multilane processing chain is configured via a virtual lane maintainer 815 and a virtual lane composer. For example, the fine grain processing behavior and the structure of the CNN engine (namely, number of layers, filter dimensions, number of filters in each layer, etc.) and the FC engine (namely, number of layers, number of neurons per layer, etc.) can be configured for an AI model execution using the lane composer functions. As described in previous sections of this disclosure, the virtual AI system multilane processing chain can be triggered via a hardware execution sequencer where each current hardware element in the chain triggers the next element (a block, sub block, etc.) in the chain, when it completes the task assigned to it. For instance, if the CNN engine is configured with multiple filters and multiple layers, then the CNN engine completes all the filters and layers before it triggers the next element in the chain i.e., the FC engine.

An initial trigger to execute a given AI model is initiated via a microcontroller, which in turn triggers an uber orchestrator 830, for example. The uber orchestrator triggers corresponding orchestrators 820 of the virtual lanes that participate while in executing the AI model. The memory 825 may be accessed to obtain the desired information for executing the AI model. The hardware execution sequencer components of the participating orchestrators execute the AI system lane processing chains to completion as per configuration. For example, a request may be initiated to train an AI model with a number of epochs, number of samples along with a pointer to location where samples are available. This can be used as a trigger to activate the orchestrator 820 of the participating virtual lane, which in turn sends a multicast trigger to all AI system lane processing lane hardware execution sequencers that are part of the virtual lane.

Figure 9:
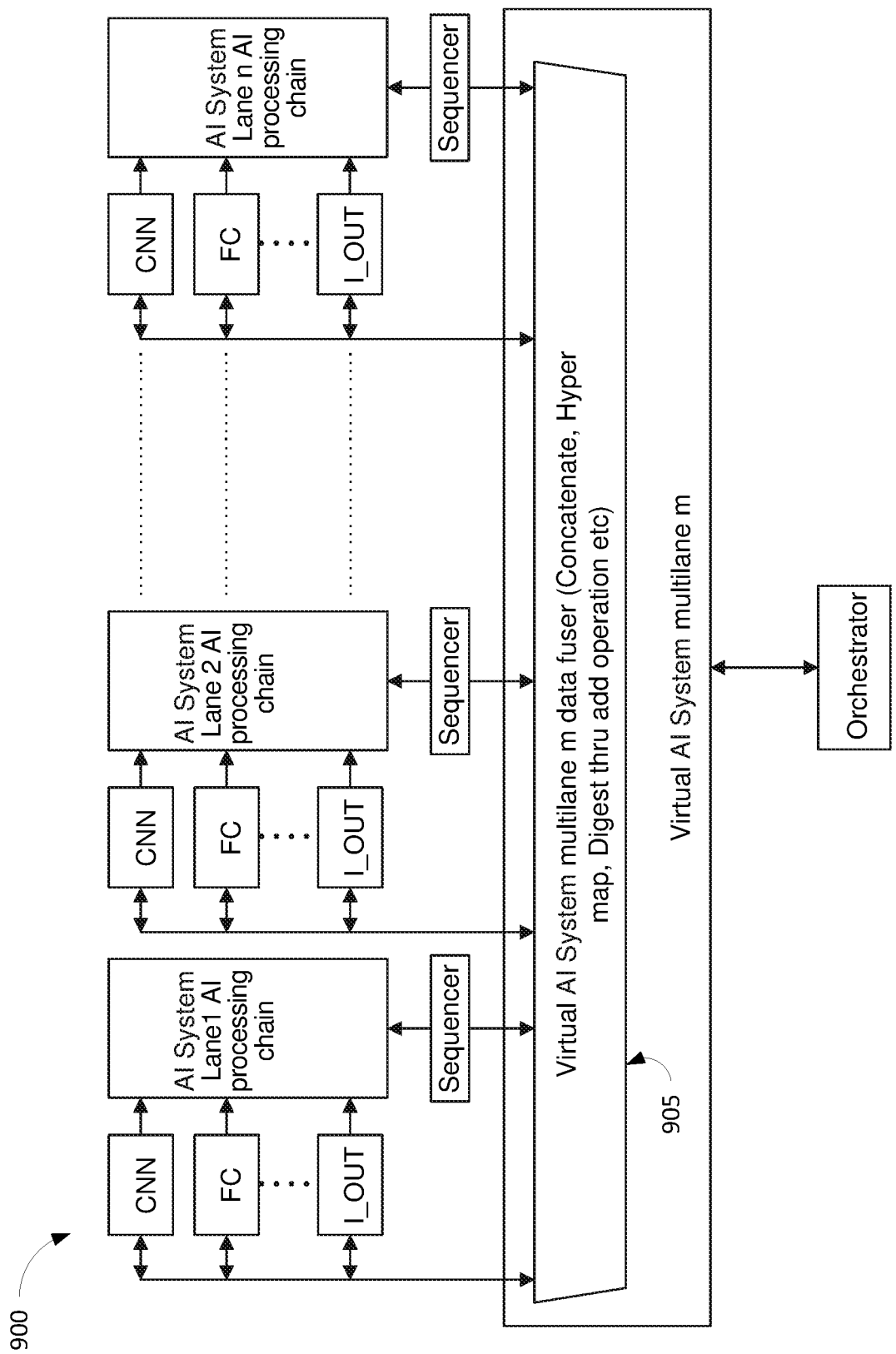
FIG. 9 is a diagram of a virtual AI system multilane comprising a data fuser, in accordance with at least one aspect of the present disclosure.

Referring to FIG. 9, illustration 900 is a diagram of a virtual AI system multilane comprising a data fuser 905, in accordance with at least one aspect of the present disclosure. The data fuser 905 is configured to concatenate, hyper map or digest, through operations such as addition, the results received from different AI system lanes that are perfectly aligned in the frequency, time and space domains. If there are L AI system lanes and M filters in an AI model, then the L/M AI model computation can be mapped to each AI system lane within a virtual AI system multilane. Once a layer is computed, all the results are concatenated from all lanes and fed to the next layer computation. Accordingly, a speed up of xL is obtained. The input can be shared to all AI system lanes which are scheduled to work on the AI model. This enables the computation of different AI models at different AI system lanes.

Figure 10:
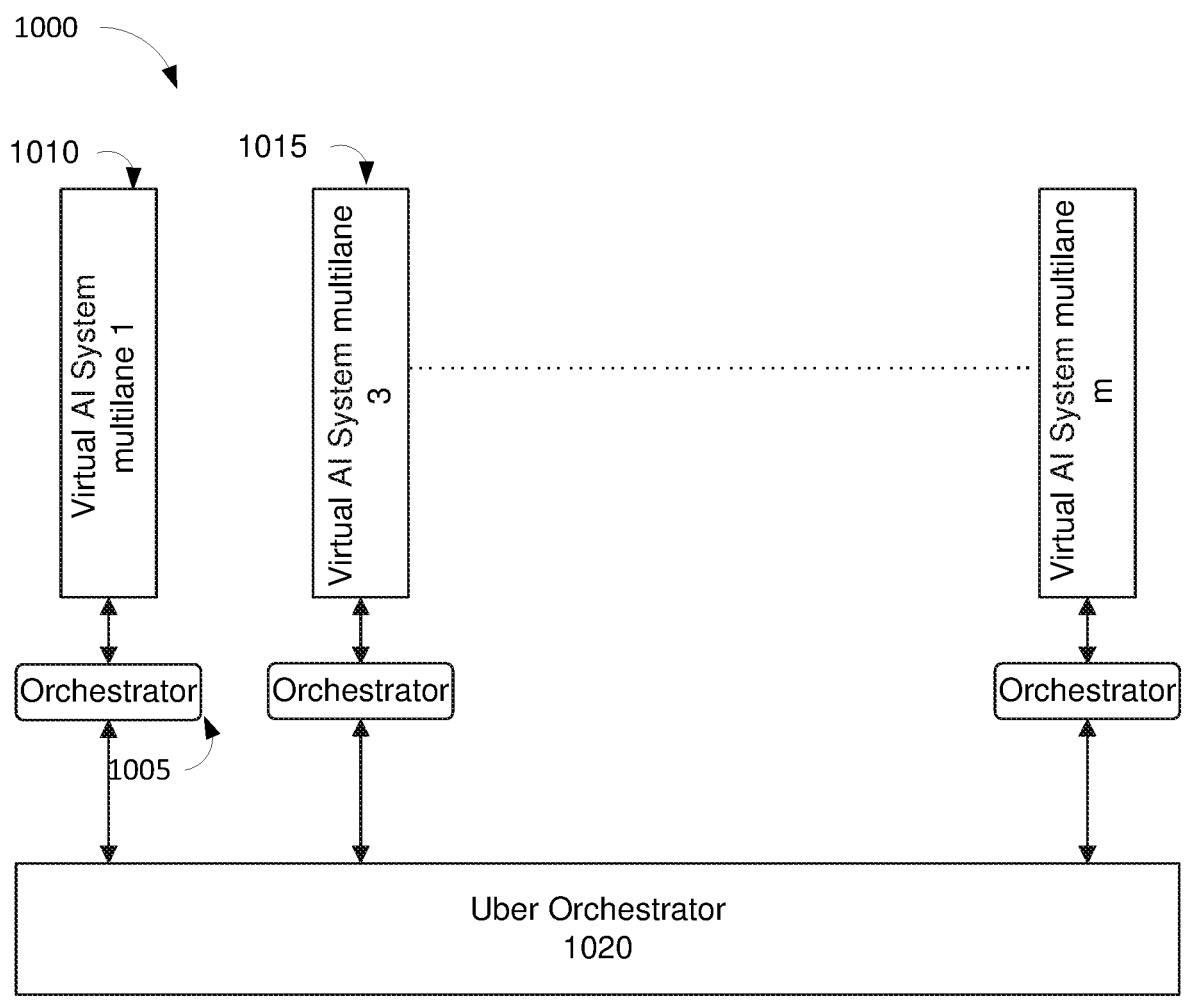
FIG. 10 is a diagram of a virtual AI system multilane comprising an uber hardware orchestrator, in accordance with at least one aspect of the present disclosure.

Referring to FIG. 10, illustration 1000 is a diagram of a virtual AI system multilane comprising an uber hardware orchestrator 1020, in accordance with at least one aspect of the present disclosure. Coupled to the uber orchestrator 1020, the AI system lane processing hardware comprises an AI system processing hardware orchestrator 1005 to setup and execute the different workloads on the each virtual AI system multilane 1010, 1015, etc., as well as the AI system lanes within the virtual AI system multilanes. As used hereinbelow, AI system lanes is used to refer to each virtual AI system multilane as well as the AI system lanes within the virtual AI system multilanes. The AI system processing hardware orchestrator 1005 operates in a hierarchical fashion. In this sense, each virtual AI system multilane 1010, 1015, etc., is controlled by an instance of the AI system processing hardware orchestrator 1005. An uber hardware AI processing hardware orchestrator 1020 is provided to oversee all AI lanes orchestrator instances. All AI system lanes report to the their respective AI processing hardware orchestrator 1005 whether they are busy or not. Depending on different criteria of the workload, the AI system processing hardware uber orchestrator 1020 will schedule the task to the specific engines in each of the AI system lanes. The AI system processing hardware uber orchestrator 1020 comprises the report of all the engines in the AI system lanes that are available to compute and also the engines in the AI system lanes that are busy. The AI system processing hardware uber orchestrator 1020 maintains a status table of AI system lanes to indicate whether the corresponding specific hardware of the AI system lane is busy or not.

Computing Power Allocations in an AI System Lane

Figure 11:
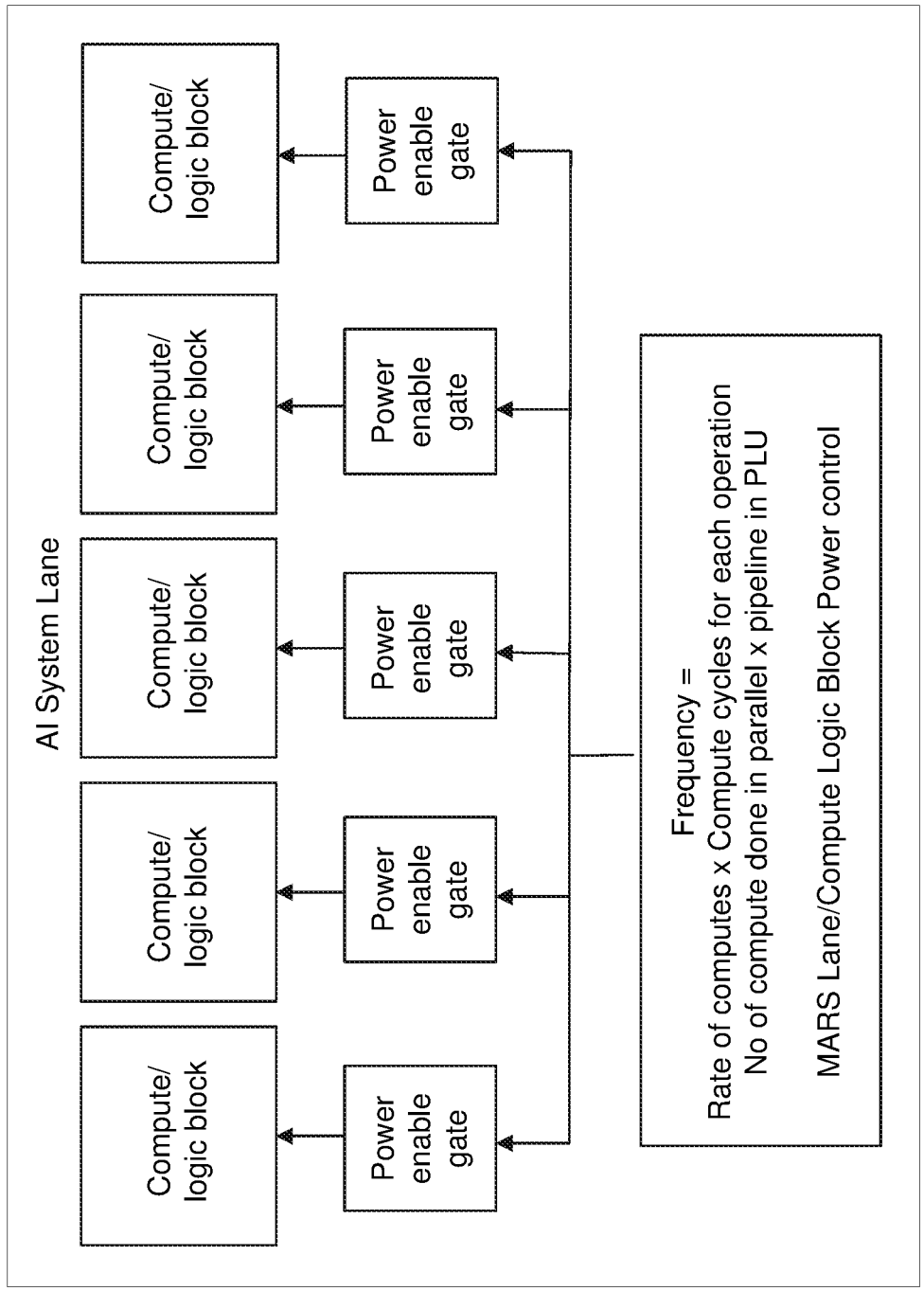
FIG. 11 shows additional detail in a block diagram of one AI system lane to illustrate how power requirements may be computed by an orchestrator coupled to the AI system lane, according to some aspects.

Referring to FIG. 11, additional detail is shown in a block diagram of one AI system lane to illustrate how power requirements may be computed by an orchestrator coupled to the AI system lane. Information from a user or stored memory associated with the local hardware will provide the number of computes or tasks, and the power available. The uber orchestrator may be configured to decide the rate of computation for the task and number of AI system lanes required to accomplish the task. The AI system lane will use the rate of computation to calculate the frequency of operation for the computes. The AI system lane will decide the power by tuning the frequency to each of the PLUs. This frequency is dependent on rate of computation required to accomplish the work given by the uber orchestrator. (Power is directly proportional to frequency.)

The uber orchestrator decides the rate of computation and the number of the computations to be done for each available AI system lane. The rate of computation is decided by the power requirement and AI algorithm provided by the user. The rate of computation in turn dictates the power/frequency requirement to accomplish the rate of computation.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skilled in the art in light of this disclosure. In addition, those skilled in the art will appreciate that the mechanisms of the subject matter described herein are capable of being distributed as one or more program products in a variety of forms and that an illustrative form of the subject matter described herein applies regardless of the particular type of signal-bearing medium used to actually carry out the distribution.

Instructions used to program logic to perform various disclosed aspects can be stored within a memory in the system, such as DRAM, cache, flash memory, or other storage. Furthermore, the instructions can be distributed via a network or by way of other computer-readable media. Thus a machine-readable medium may include any mechanism for storing or transmitting information in a form readable by a machine (e.g., a computer), but is not limited to, floppy diskettes, optical disks, CD-ROMs, magneto-optical disks, ROM, RAM, EPROM, EEPROM, magnetic or optical cards, flash memory, or tangible, machine-readable storage used in the transmission of information over the Internet via electrical, optical, acoustical, or other forms of propagated signals (e.g., carrier waves, infrared signals, digital signals). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, DSP, PLD, programmable logic array (PLA), or FPGA), state machine circuitry, firmware that stores instructions executed by programmable circuitry, and any combination thereof. The control circuit may, collectively or individually, be embodied as circuitry that forms part of a larger system, for example, an integrated circuit, an application-specific integrated circuit (ASIC), a system on-chip (SoC), desktop computers, laptop computers, tablet computers, servers, smart phones, etc. Accordingly, as used herein, "control circuit" includes, but is not limited to, electrical circuitry having at least one discrete electrical circuit, electrical circuitry having at least one integrated circuit, electrical circuitry having at least one application-specific integrated circuit, electrical circuitry forming a general-purpose computing device configured by a computer program (e.g., a general-purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware, and/or circuitry configured to perform any of the aforementioned operations. Software may be embodied as a software package, code, instructions, instruction sets, and/or data recorded on non-transitory computer-readable storage medium. Firmware may be embodied as code, instructions, instruction sets, and/or data that are hard-coded (e.g., non-volatile) in memory devices.

As used in any aspect herein, the terms "component," "system," "module," and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet-switched network. The communication devices may be capable of communicating with each other using a selected packet-switched network communications protocol. One example communications protocol may include an Ethernet communications protocol which may be capable permitting communication using a Transmission Control Protocol/IP. The Ethernet protocol may comply or be compatible with the Ethernet standard published by the Institute of Electrical and Electronics Engineers (IEEE) titled "IEEE 802.3 Standard," published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum, titled "ATM-MPLS Network Interworking 2.0," published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components, inactive-state components, and/or standby-state components, unless context requires otherwise.

Those skilled in the art will recognize that, in general, terms used herein, and especially in the appended claims (e.g., bodies of the appended claims), are generally intended as "open" terms (e.g., the term "including" should be interpreted as "including, but not limited to"; the term "having" should be interpreted as "having at least"; the term "includes" should be interpreted as "includes, but is not limited to"). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations or two or more recitations). Furthermore, in those instances where a convention analogous to "at least one of A, B, and C, etc." is used, in general, such a construction is intended in the sense that one having skill in the art would understand the convention (e.g., "a system having at least one of A, B, and C" would include, but not be limited to, systems that have A alone, B alone, C alone, A and B together, A and C together, B and C together, and/or A, B, and C together). In those instances where a convention analogous to "at least one of A, B, or C, etc." is used, in general, such a construction is intended in the sense that one having skill in the art would understand the convention (e.g., "a system having at least one of A, B, or C" would include, but not be limited to, systems that have A alone, B alone, C alone, A and B together, A and C together, B and C together, and/or A, B, and C together). It will be further understood by those within the art that typically a disjunctive word and/or phrase presenting two or more alternative terms, whether in the description, claims, or drawings, should be understood to contemplate the possibilities of including one of the terms, either of the terms, or both terms, unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures, or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials are not inconsistent herewith. As such, and to the extent necessary, the disclosure as explicitly set forth herein supersedes any conflicting material incorporated herein by reference. Any material, or portion thereof, that is said to be incorporated by reference herein but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

EXAMPLES

Various aspects of the subject matter described herein are set out in the following numbered examples:

Example 1. An artificial intelligence (AI) power management system comprising: a plurality of AI lane modules each configured to conduct an AI learning and/or inferencing task in parallel with other AI lane modules, each AI lane module comprising: a plurality of compute/logic blocks configured to perform AI learning and/or inferencing; for each of the of AI lane modules in the plurality of AI lane modules, an associated orchestrator module configured to: possess knowledge of power requirements and functional capacity needed to perform the AI learning and/or inferencing; and transmit an activate command to activate power to each of the plurality of compute/logic blocks comprised in said AI lane module, based on said knowledge of the power requirements and functional capacity needed to perform the AI learning and/or inferencing; an AI system lane power control module electrically coupled to each of the AI lane modules and configured to transmit power to each of the AI lane modules, after receiving the activate command from the associated orchestrators of the AI lane modules that are to be powered on; and an uber orchestrator module communicatively coupled to the AI system lane power control module and configured to transmit instructions to the AI system lane power control module instructing which AI lane modules to transmit power to.

Example 2. The AI power management system of Example 1, further comprising, for each of the AI lane modules in the plurality of AI lane modules, a sequencer communicatively coupled to said AI lane module and the associated orchestrator of said AI lane module and configured to instruct said AI lane module to perform the AI learning and/or inferencing.

Example 3. The AI power management system of Example 1 or 2, wherein the orchestrator is configured to transmit an activate command to the sequencer before the sequencer can instruct the AI lane module to perform the AI learning and/or inferencing.

Example 4. The AI power management system of any of Examples 1 to 3, wherein the associated orchestrator of an AI lane module is further configured to transmit a deactivate command to the deactivate power to said AI lane module after the AI lane module has completed the AI learning and/or inferencing sequence.

Example 5. The AI power management system of any of Examples 1 to 4, where the associated orchestrator of an AI lane module is further configured to modulate a clock frequency of the AI lane module.

Example 6. The AI power management system of any of Examples 1 to 5, wherein the clock frequency is modulated by the associated orchestrator to fit a power envelope of the AI lane module during performing the AI learning and/or inferencing.

Example 7. The AI power management system of claim 5, wherein the associated orchestrator of the AI lane module is further configured to gate compute/logic block of the AI lane module that is not utilized in the AI learning and/or inferencing such that said compute/logic block ceases to receive power during the AI learning and/or inferencing.

Example 8. A method of an artificial intelligence (AI) power management system, the method comprising: obtaining, by an orchestrator module associated with an AI lane module among a plurality of AI lane modules, knowledge of power requirements and functional capacity needed to perform an AI learning and/or inferencing algorithm; transmitting, by the orchestrator, an activate command to activate power to each of a plurality of compute/logic blocks comprised in said AI lane module, based on said knowledge of the power requirements and functional capacity needed to perform the AI learning and/or inferencing; transmitting, by an AI system lane power control module electrically coupled to the AI lane module, power to the AI lane module, after receiving the activate command from the associated orchestrator of the AI lane module; transmitting, by an uber orchestrator module communicatively coupled to the AI system lane power control module, instructions to the AI system lane power control module instructing which AI lane modules to transmit power to; and conducting, by the AI lane module, an AI learning and/or inferencing task in parallel with other AI lane modules, after receiving the activate command from the associated orchestrator.

What is claimed is:

1. An artificial intelligence (AI) power management system comprising:
    a plurality of AI lane modules each configured to conduct an AI learning and/or inferencing task in parallel with other AI lane modules, each AI lane module comprising:
        a plurality of compute/logic blocks configured to perform AI learning and/or inferencing;
    for each of the of AI lane modules in the plurality of AI lane modules, an associated orchestrator module configured to:
        possess knowledge of power requirements and functional capacity needed to perform the AI learning and/or inferencing; and
        transmit an activate command to activate power to each of the plurality of compute/logic blocks comprised in said AI lane module, based on said knowledge of the power requirements and functional capacity needed to perform the AI learning and/or inferencing;
    an AI system lane power control module electrically coupled to each of the AI lane modules and configured to transmit power to each of the AI lane modules, after receiving the activate command from the associated orchestrators of the AI lane modules that are to be powered on; and
    an uber orchestrator module communicatively coupled to the AI system lane power control module and configured to transmit instructions to the AI system lane power control module instructing which AI lane modules to transmit power to.

2. The AI power management system of claim 1, further comprising, for each of the AI lane modules in the plurality of AI lane modules, a sequencer communicatively coupled to said AI lane module and the associated orchestrator of said AI lane module and configured to instruct said AI lane module to perform the AI learning and/or inferencing.

3. The AI power management system of claim 2, wherein the orchestrator is configured to transmit an activate command to the sequencer before the sequencer can instruct the AI lane module to perform the AI learning and/or inferencing.

4. The AI power management system of claim 1, wherein the associated orchestrator of an AI lane module is further configured to transmit a deactivate command to the deactivate power to said AI lane module after the AI lane module has completed the AI learning and/or inferencing sequence.

5. The AI power management system of claim 1, where the associated orchestrator of an AI lane module is further configured to modulate a clock frequency of the AI lane module.

6. The AI power management system of claim 5, wherein the clock frequency is modulated by the associated orchestrator to fit a power envelope of the AI lane module during performing the AI learning and/or inferencing.

7. The AI power management system of claim 5, wherein the associated orchestrator of the AI lane module is further configured to gate compute/logic block of the AI lane module that is not utilized in the AI learning and/or inferencing such that said compute/logic block ceases to receive power during the AI learning and/or inferencing.

8. A method of an artificial intelligence (AI) power management system, the method comprising:
    obtaining, by an orchestrator module associated with an AI lane module among a plurality of AI lane modules, knowledge of power requirements and functional capacity needed to perform an AI learning and/or inferencing algorithm;
    transmitting, by the orchestrator, an activate command to activate power to each of a plurality of compute/logic blocks comprised in said AI lane module, based on said knowledge of the power requirements and functional capacity needed to perform the AI learning and/or inferencing;
    transmitting, by an AI system lane power control module electrically coupled to the AI lane module, power to the AI lane module, after receiving the activate command from the associated orchestrator of the AI lane module;
    transmitting, by an uber orchestrator module communicatively coupled to the AI system lane power control module, instructions to the AI system lane power control module instructing which AI lane modules to transmit power to; and
    conducting, by the AI lane module, an AI learning and/or inferencing task in parallel with other AI lane modules, after receiving the activate command from the associated orchestrator.

9. The method of claim 8, further comprising, for each of the AI lane modules in the plurality of AI lane modules, instructing, by a sequencer communicatively coupled to said AI lane module and the associated orchestrator of said AI lane module, said AI lane module to perform the AI learning and/or inferencing.

10. The method of claim 9, further comprising transmitting by the orchestrator, an activate command to the sequencer before the sequencer instructs the AI lane module to perform the AI learning and/or inferencing.

11. The method of claim 8, further comprising transmitting, by the associated orchestrator of an AI lane module, a deactivate command to the deactivate power to said AI lane module after the AI lane module has completed the AI learning and/or inferencing sequence.

12. The method of claim 8, further comprising modulating, by the associated orchestrator of an AI lane module, a clock frequency of the AI lane module.

13. The method of claim 12, wherein the clock frequency is modulated by the associated orchestrator to fit a power envelope of the AI lane module during performing the AI learning and/or inferencing.

14. The method of claim 12, further comprising gating, by the associated orchestrator of the AI lane module, a compute/logic block of the AI lane module that is not utilized in the AI learning and/or inferencing such that said compute/logic block ceases to receive power during the AI learning and/or inferencing.

* * * * *